Figure 1:
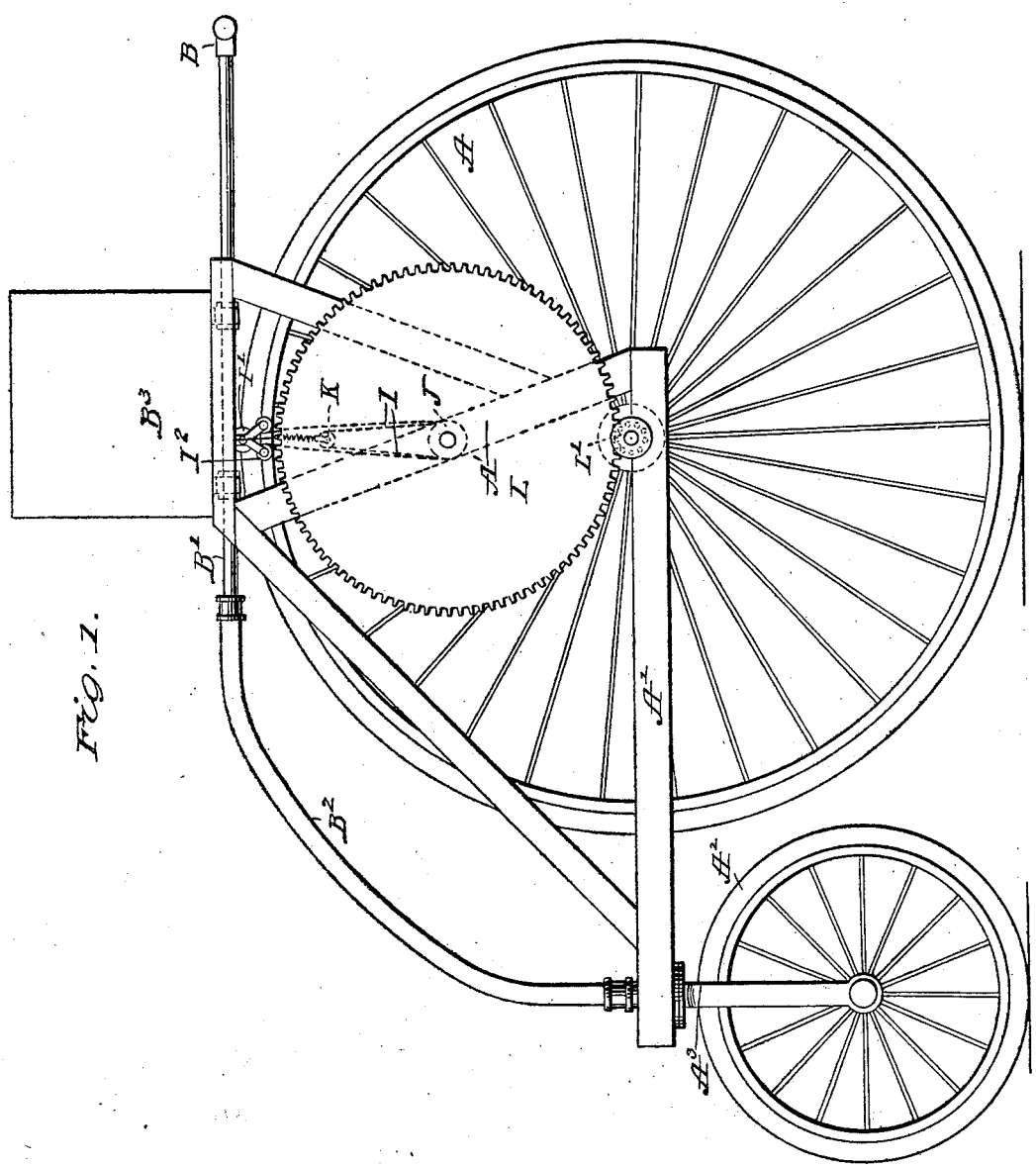

(No Model.) 4 Sheets—Sheet 1.

C. W. SMITH & E. B. NOYES.
APPARATUS FOR AUTOMATICALLY PLOTTING TOPOGRAPHICAL SECTIONS.

No. 565,695. Patented Aug. 11, 1896.

WITNESSES:

INVENTORS:
Charles W. Smith
Ellis B. Noyes
BY
Baldwin, Davidson & Wight
ATTORNEYS (No Model.) 4 Sheets—Sheet 2.
C. W. SMITH & E. B. NOYES.
APPARATUS FOR AUTOMATICALLY PLOTTING TOPOGRAPHICAL SECTIONS.
No. 565,695. Patented Aug. 11, 1896.
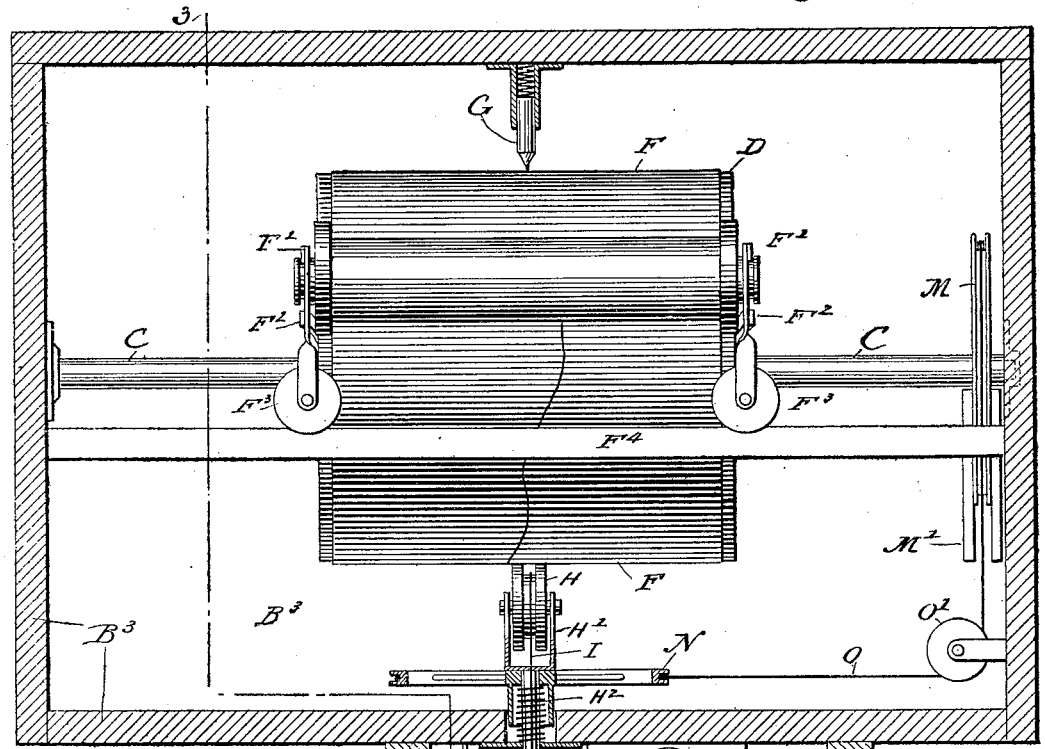
Fig. 2.
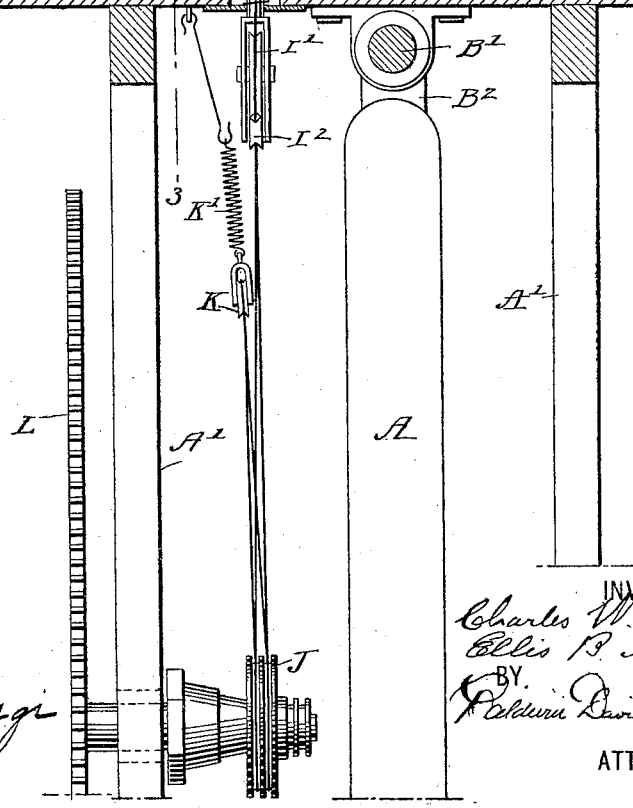
WITNESSES:
Frank S. Ober
Catharine George
INVENTORS:
Charles W. Smith
Ellis B. Noyes
BY
Parkum Davidson Wright
ATTORNEYS.

(No Model.) 4 Sheets—Sheet 3.

C. W. SMITH & E. B. NOYES.
APPARATUS FOR AUTOMATICALLY PLOTTING TOPOGRAPHICAL SECTIONS.

No. 565,695. Patented Aug. 11, 1896.

(No Model.) 4 Sheets—Sheet 4.
C. W. SMITH & E. B. NOYES.
APPARATUS FOR AUTOMATICALLY PLOTTING TOPOGRAPHICAL SECTIONS.
No. 565,695. Patented Aug. 11, 1896.
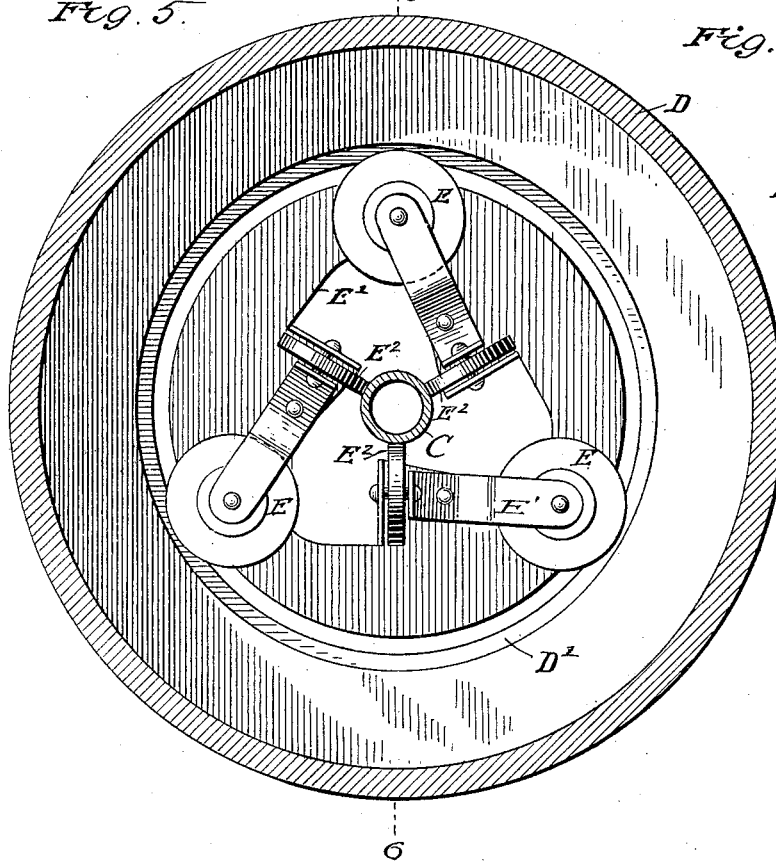
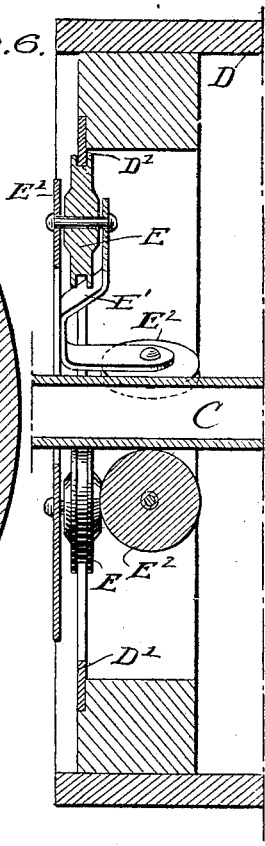
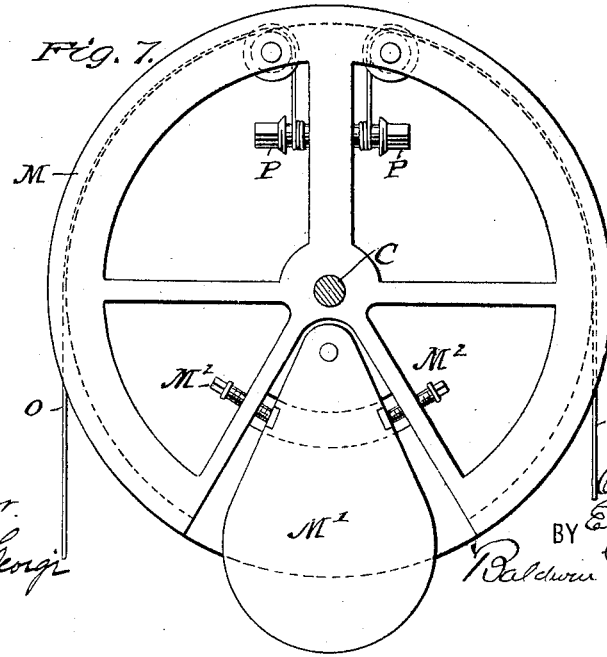
WITNESSES:
Frank S. Ober
Catharine George
INVENTORS:
Charles W. Smith
Ellis B. Noyes
BY Baldwin Davidson & Wight
ATTORNEYS.
THE NORRIS PETERS CO., PHOTO-LITHO., WASHINGTON, D. C.

UNITED STATES PATENT OFFICE.

CHARLES W. SMITH, OF BROOKLYN, NEW YORK, AND ELLIS B. NOYES, OF PORTSMOUTH, VIRGINIA.

APPARATUS FOR AUTOMATICALLY PLOTTING TOPOGRAPHICAL SECTIONS.

SPECIFICATION forming part of Letters Patent No. 565,695, dated August 11, 1896.

Application filed October 12, 1895. Serial No. 565,451. (No model.)

*To all whom it may concern:*

Be it known that we, CHARLES W. SMITH, residing in the city of Brooklyn, county of Kings, and State of New York, and ELLIS B. NOYES, residing in the city of Portsmouth, county of Norfolk, and State of Virginia, citizens of the United States, have invented certain new and useful Improvements in Apparatus for Automatically Plotting Topographical Sections, of which the following is a specification.

This invention has for its object to automatically plot or delineate topographical sections; and it consists of recording mechanism carried on a vehicle adapted to be moved over the ground and having the general characteristics of a bicycle, one of the wheels of which is a measuring driving-wheel.

The recording or section-delineating mechanism comprises a drum mounted on a horizontal shaft in such manner as to rotate and move longitudinally freely thereon, and to receive and carry a strip of paper which is wound on the drum as it rotates; a pencil or marking device arranged to bear on the paper carried by the drum; a driving-roller arranged to bear on the drum or on the paper surrounding it, carried by a frame controlled to normally hold the roller in a plane coincident with a transverse section of the drum and to set the roller in angular positions thereto; driving-gear for communicating motion to the roller from the measuring driving-wheel of the machine; an inclination-controlled device—that is, a device acting on the principle of a pendulum, connected to the frame carrying the driving-roller and causing angular variations of the roller relative to the recording-drum, when the inclination of the direction of travel of the machine is varying; and a paper-carriage adapted to hold a roll of paper to be supplied to the drum as it rotates, and connected to the bearing-frames of the drum so as to move longitudinally therewith. It will be seen from this brief description of our improved topographical-section delineator that the recording-drum is rotated by friction from the driving-roller, and that as long as this driving-roller is in line therewith, or the axes of the two are parallel, a straight line will be marked on the paper, but that when the machine is tipped out of a horizontal position in ascending or descending hills the driving-roller will be inclined to the drum and cause it to move longitudinally as well as to rotate, thus causing sinuous lines to be marked on the paper, the departure of which from the normal or from a datum-line will be in proportion to the inclination of the ascents and descents, thus giving a correct record of the contour, profile, or section of the ground traveled over.

Figure 3:
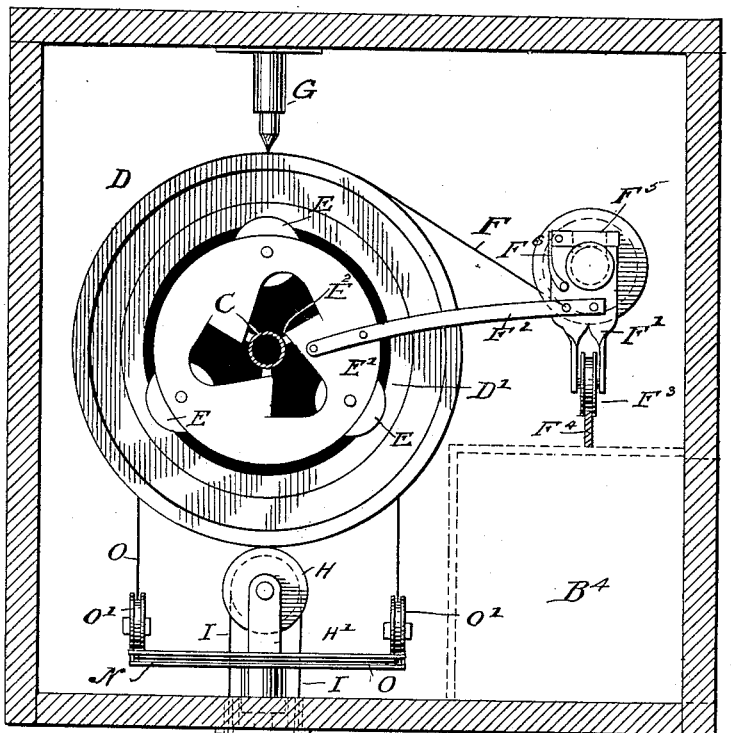
Figure 4:
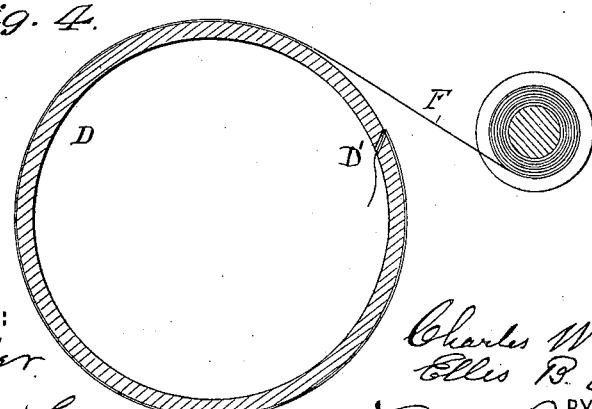

In the accompanying drawings, to which we will now refer to more fully describe our invention, Figure 1 is a side elevation of the bicycle-carriage and box carried thereby containing the recording mechanism of the topographical-section delineator. Fig. 2 is a sectional view showing the drum and driving mechanism on an enlarged scale. Fig. 3 is an end view of the drum and driving mechanism, taken on the line 3 3, Fig. 2. Fig. 4 is a transverse section of the drum and the roll of paper. Fig. 5 is a transverse section of the drum, showing its antifriction supporting-bearings. Fig. 6 is a section of the devices shown in Fig. 5 on the line 6 6, and Fig. 7 is a front view of the inclination-controlled device.

The complete apparatus, as shown in Fig. 1, partakes of the general character of a bicycle, consisting of the main driving-wheel A, fitted to rotate in bearings in the frame A', the front driving-wheel A², carried by the fork A³, the trunk of which has a vertical bearing in the front part of the frame, the steering-handle B, secured to the rear end of the shaft B', fitted in bearings in the frame over the wheel A, the flexible shaft connection B², joining together the front end of the shaft B' and the top of trunk of fork A³, and the box B³, which contains the recording mechanism, secured to the top of the frame.

In the box B³, transversely arranged, is the fixed shaft C, on which the recording-drum D is held and operated. This drum D consists of a cylindrical shell provided with internal end flanges D' D', the edges of which constitute the bearings of the rotative motion of the drum, each of said flange-bearings being supported and controlled by three grooved rollers E E E, pivoted to the frames or plates E' E', which plates also carry three rollers E² E² E², arranged axially at right angles to the rollers E E E and so located as to bear and roll on the shaft C. By this construction it will be seen that the drum D is free to rotate and to slide longitudinally on the shaft C with the least amount of friction. This drum D is adapted to receive and have wound thereon as it is rotated a strip of paper F, the end of which is placed in the slot D' of the drum, and which paper is placed as a roll in the carriage F', the ends of said carriage being attached to the plates E' E' of the roller-bearings by the bars F², and provided with rollers F³ F³, which rest and travel on the rail F⁴. The roll of paper F and its carriage are thus caused to move with the drum during its longitudinal movements on the shaft C. To facilitate the placing of the roll of paper F in its carriage, the ends of the carriage have slotted bearings, the caps F⁵ F⁵ of these bearings being pivoted at one end and held down by the springs F⁶ F⁶. The space B⁴ beneath the carriage (indicated inclosed by the dotted line, Fig. 3) may be utilized to hold extra rolls of paper.

To the lower side of the cover of the box B³ is fastened the spring acting or weighted marker or pencil G, arranged with its point bearing on the paper on the drum directly over the center of the drum when it occupies a central position. The driving-roller H, which imparts motion to the drum D from the wheel A, rotates on a spindle held in the upper end of the frame H', fitted to rotate in a bearing on the bottom of the box B³, and to play longitudinally relatively to said bearing, the frame being upheld by the spring H², so as to cause the roller H to continually bear against the drum D or against the paper thereon. This roller H is grooved, and around it passes the cord I, which also plays in the groove of the guide-roller I', being held therein by the two small rollers I² I². These rollers I' and I² I² are also carried by the frame H'. From the small guide-rollers I² I² each of the two parts of the cord pass down around one of the two larger grooves of the cone-pulley J, and from these grooves they extend upwardly to form a loop which embraces the roller K, carried by a yoke and held up by the spring K'. This roller K and its spring act as a tightening device for the cord to keep it always taut and also permit of the cord being placed around the smaller set of grooves J' J' of the pulley J, and held taut thereon without necessitating taking up the cord.

The pulley J is secured to a short shaft having a bearing on the frame A', and to this shaft is secured the large gear-wheel L, which meshes into a pinion L', secured to the axle of the driving-wheel A. The proportion of the gearing and the pulleys controlling the cord I in relation to the driving-wheel and driving-roller H is such that the length of paper moved by the roller H will bear a given known relation to the distance the wheel A moves over the ground, and this relation may be changed at will by shifting the cord I on the different sets of grooves of the pulley J. Two sets of such grooves only are shown, but any desired number may be used.

The part of the apparatus that is controlled by the inclination of the machine as it is being moved up or down inclined surfaces consists of a light pulley M, fitted to rock on a reduced end of the shaft C with the least possible amount of friction, a weight M', attached to the pulley M, adjusted and held rigidly thereto by the set-screws M² M², the grooved pulley N, secured in horizontal position to the frame H', which carries the driving-roller H, the cord O, placed around the pulley N, under the guide-rollers O' O', and to the pulley M, with its ends secured to the tightening-pins P P, seated in one of the arms of the pulley. The object of the tightening-pins is to set the various parts in correct operative positions, that is, to set the driving-roller in line with the drum D when the machine is resting on a horizontal surface with the pulley M held in normal position by its pendulum-weight M', so that when the machine is moved over a horizontal surface the drum D will be simply rotated by the driving-roller H without any longitudinal movement, thus causing a right line to be marked on the paper G. Now when the machine meets any irregularities in the surface over which it is operated the central line of the frame H' or axis of the pulley N will move out of the vertical plane which embraces the axis of the pulley M, or the central vertical line of the pendulum-weight M', and, as the pendulum-weight always maintains the pulley M in a relatively fixed vertical position, the pulley N is turned by the action of the cord O thereon, and sets the driving-roller in angular positions in proportion to the angle of the ascent or descent of the machine and a direction from its normal central position according to an upward or downward movement of the machine on inclines.

The angular positions assumed by the driving-roller H imparts a compound movement to the drum D, that is, a rotary motion and a longitudinal motion, the effect of which is to cause the line marked by the pencil to be inclined to the datum-line, or line marked when the machine is traveling over level ground. The machine in laying out or indicating a vertical section of any piece of ground will be started from a fixed determined level, and the departures of the line marked from the datum-line representing this level will be on one side of it for points higher and on the other side of it for points lower than the determined level, the areas of the spaces marked by the departure from the datum-line being proportionate to the sectional areas of the ground corresponding to them and the starting level.

We have shown our invention applied to a vehicle to be pushed along. Obviously it may be applied to a propelled or drawn vehicle.

We claim as our invention—

1. In a topographical-section delineator, the combination of a rotatable and longitudinally-movable recording-drum and paper carried thereby, a fixed shaft on which the drum is fitted to rotate and move longitudinally, a stationary pencil or marker bearing on the paper-covered drum, a driving-roller arranged to bear against the paper-covered drum and adapted to be set in different angular positions relative thereto, an inclination-controlled device connected to the driving-roller, whereby said roller is set in different angular positions and means for rotating the driving-roller.

2. In a topographical-section delineator, the combination of a rotatable and longitudinally-movable recording-drum, a paper-roll carrier attached to and movable longitudinally with the drum, a stationary marker bearing on the paper-covered drum, a driving-roller that bears against the drum and is adapted to be set in different angular positions relative thereto, an inclination-controlled device connected to the driving-roller, whereby said roller is set in different angular positions and means for rotating the driving-roller as the delineator traverses the ground.

3. In a topographical-section delineator, the combination of a shaft, a drum rotatable around and longitudinally movable on the shaft upon roller-bearings, a paper-roll carrier movable with the drum in its longitudinal movement and traveling upon rolls running on a way or track, a stationary marker bearing on the paper-covered drum, a driving-roller that bears against the drum and is adapted to be set in different angular positions relative thereto, an inclination-controlled device connected to the driving-roller, whereby said roller is set in different angular positions and means for rotating the driving-roller as the delineator traverses the ground.

4. In a topographical-section delineator, the combination of a fixed horizontal shaft, a recording-drum consisting of a cylindrical shell with internal flanges at its ends, a bearing-plate at each end of the drum, grooved rollers pivoted to the plates and bearing on the internal flanges of the drum, rollers carried by the plates and arranged to bear longitudinally on the shaft, and means for rotating the drum and causing it to move longitudinally over the shaft.

5. In a topographical-section delineator, the combination of a fixed horizontal shaft, a recording-drum consisting of a cylindrical shell with internal flanges at its ends, a bearing-plate at each end of the drum, grooved rollers pivoted to the plates and bearing on the internal flanges of the drum, rollers carried by the plates and arranged to bear longitudinally on the shaft, means for rotating the drum and causing it to move longitudinally over the shaft, a roll of paper, a carriage for holding the same connected to the bearing-plates of the drum, and a rail arranged parallel to the fixed shaft and on which the carriage slides.

6. In a topographical-section delineator, the combination of a recording-drum and paper carried thereby, a fixed shaft on which the drum is fitted to rotate and move longitudinally, a pencil or marker bearing on the paper-covered drum, a driving-roller arranged to bear against the paper-covered drum and adapted to be set in different angular positions relative thereto, a pulley fastened to the frame of the driving-roller, a pendulum-weighted pulley, a cord connecting this pulley to the pulley of the driving-roller frame, and means for rotating the driving-roller.

7. In a topographical-section delineator, the combination of a recording-drum and paper carried thereby, a fixed shaft on which the drum is fitted to rotate and move longitudinally, a pencil or marker bearing on the paper-covered drum, a driving-roller arranged to bear against the paper-covered drum and adapted to be set in different angular positions relative thereto, a two-wheeled vehicle carrying the apparatus, grooved pulleys actuated from one of the wheels of the vehicle, a cord connecting the pulleys to the driving-roller, and a spring-acting take-up pulley in a loop of this cord.

8. In a topographical-section delineator, the combination of a recording-drum and paper carried thereby, a fixed shaft on which the drum is fitted to rotate and move longitudinally, a pencil or marker bearing on the paper-covered drum, a driving-roller arranged to bear against the paper-covered drum, and adapted to be set in different angular positions relative thereto, a pulley fastened to the frame of the driving-roller, a pendulum-weighted pulley, a cord connecting this pulley to the pulley of the driving-roller frame, means for rotating the driving-roller, a two-wheeled vehicle carrying the apparatus, grooved pulleys actuated from one of the wheels of the vehicle, a cord connecting the pulleys to the driving-roller, and a spring-acting take-up pulley in a loop of this cord.

In testimony whereof we have hereunto subscribed our names.

CHARLES W. SMITH.
ELLIS B. NOYES.

Witnesses as to Charles W. Smith:
FRANK S. OBER,
EDWARD C. DAVIDSON.
Witnesses as to Ellis B. Noyes:
H. L. WATTS,
KENNETH G. MILLER.